(12) United States Patent
Tanaka

(10) Patent No.: US 7,347,563 B2
(45) Date of Patent: Mar. 25, 2008

(54) APPARATUS FOR FIXING A REFLECTIVE OR TRANSMISSIVE LIQUID-CRYSTAL DISPLAY ELEMENT TO A PRISM MEMBER

(75) Inventor: Hidetomo Tanaka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 11/219,262

(22) Filed: Sep. 1, 2005

(65) Prior Publication Data

US 2006/0061734 A1    Mar. 23, 2006

(30) Foreign Application Priority Data

Sep. 17, 2004    (JP) ............... 2004-271576

(51) Int. Cl.
*G03B 21/28*  (2006.01)
*G03B 21/26*  (2006.01)
*G02F 1/13*   (2006.01)

(52) U.S. Cl. ............. 353/33; 353/34; 353/81; 353/119; 353/122; 353/37

(58) Field of Classification Search ......... 353/119, 353/33, 37, 34, 81, 122
See application file for complete search history.

(56) References Cited

U.S. PATENT DOCUMENTS 5,868,485 A    2/1999  Fujimori 5,978,054 A * 11/1999  Fujimori .................. 349/60
6,053,616 A     4/2000  Fujimori
6,320,709 B1 * 11/2001  Kitabayashi et al. ...... 359/831

FOREIGN PATENT DOCUMENTS

JP    10-10994 A       1/1998
JP    2003-262917 A    9/2003

* cited by examiner

*Primary Examiner*—Diane I. Lee
*Assistant Examiner*—Magda Cruz
(74) *Attorney, Agent, or Firm*—Canon USA, Inc., IP Division

(57) ABSTRACT

At least one exemplary embodiment is directed to a projection display apparatus configured to project an image on a projection plane, the image being formed using light from a light source by an image-forming element, is provided. The projection display apparatus includes a prism, a first securing member operatively connected to the prism and includes a bonding surface substantially parallel to an optical axis of a light beam entering the image-forming element, a second securing member holding the image-forming element and includes a bonding surface substantially perpendicular to the optical axis of the light beam entering the image-forming element.

8 Claims, 5 Drawing Sheets

APPARATUS FOR FIXING A REFLECTIVE OR TRANSMISSIVE LIQUID-CRYSTAL DISPLAY ELEMENT TO A PRISM MEMBER

BACKGROUND OF THE INVENTION

1. Field of the Invention

The present invention relates to a projection display apparatus and more particularly to a projection display apparatus configured to fix a reflective or transmissive liquid-crystal display (LCD) element (image-forming element) to a prism member.

2. Description of the Related Art

In conventional optical engines in projectors using light valves (e.g., LCD elements (image-forming elements)), various types of light-valve fixing units for fixing an LCD element to a fixing frame have been suggested. One such example is discussed in Japanese Patent Laid-Open No. 10-010994. As illustrated by this patent document, a light-valve frame plate 51 fixing a light valve 40R is detachably coupled with screws 56 to a fixation frame plate 54 fixed to a light incident surface 22R of light combining device 21. The projection-type display device shown in this patent document includes many intermediate members, and therefore, could be subject to a reduced shock and vibration resistance in response to dropping and to change over time, and thus exhibits reduced durability. In addition, since positioning device 57, for positioning the light valve, is disposed between temporal fixing sets, if the positioning device undergoes thermal expansion, the light valve could become distorted. Moreover, since the positioning device can be wedge-shaped, the light valve could be deformed when being inserted, depending on the strength applied. Further, since the positioning device is relatively distant from the temporal fixing device, a counter force can not be sufficient when a stress in the positioning device is released. Furthermore, since the wedge-shaped positioning device can be inserted into a small gap, the assembly operation can be difficult. Additionally, since the wedge-shaped positioning device, disposed in the small gap, is less prone to receiving light, curing the positioning device with ultraviolet light can be difficult and the direction of irradiation is limited, and therefore, the UV irradiation jig is inevitably complicated and the number of necessary irradiation operations is increased.

SUMMARY OF THE INVENTION

At least one exemplary embodiment is directed to a projection display apparatus (e.g., liquid-crystal projector) configured to fix an image-forming element to a target fixation member and configured to project image information realized by the image-forming element with increased resolution.

At least one exemplary embodiment is directed to a projection display apparatus configured to project an image on a projection plane, the image being formed using light from a light source by an image-forming element. In at least one exemplary embodiment, the projection display apparatus can include a prism, a first securing member fixed to the prism and including a bonding surface substantially parallel to an optical axis of a light beam entering the image-forming element, a second securing member holding the image-forming element and including a bonding surface substantially perpendicular to the optical axis of the light beam entering the image-forming element, and at least one spacer bonded between the first securing member and the second securing member.

Further features of the present invention will become apparent from the following description of exemplary embodiments (with reference to the attached drawings).

DESCRIPTION OF THE EMBODIMENTS

Figure 1:
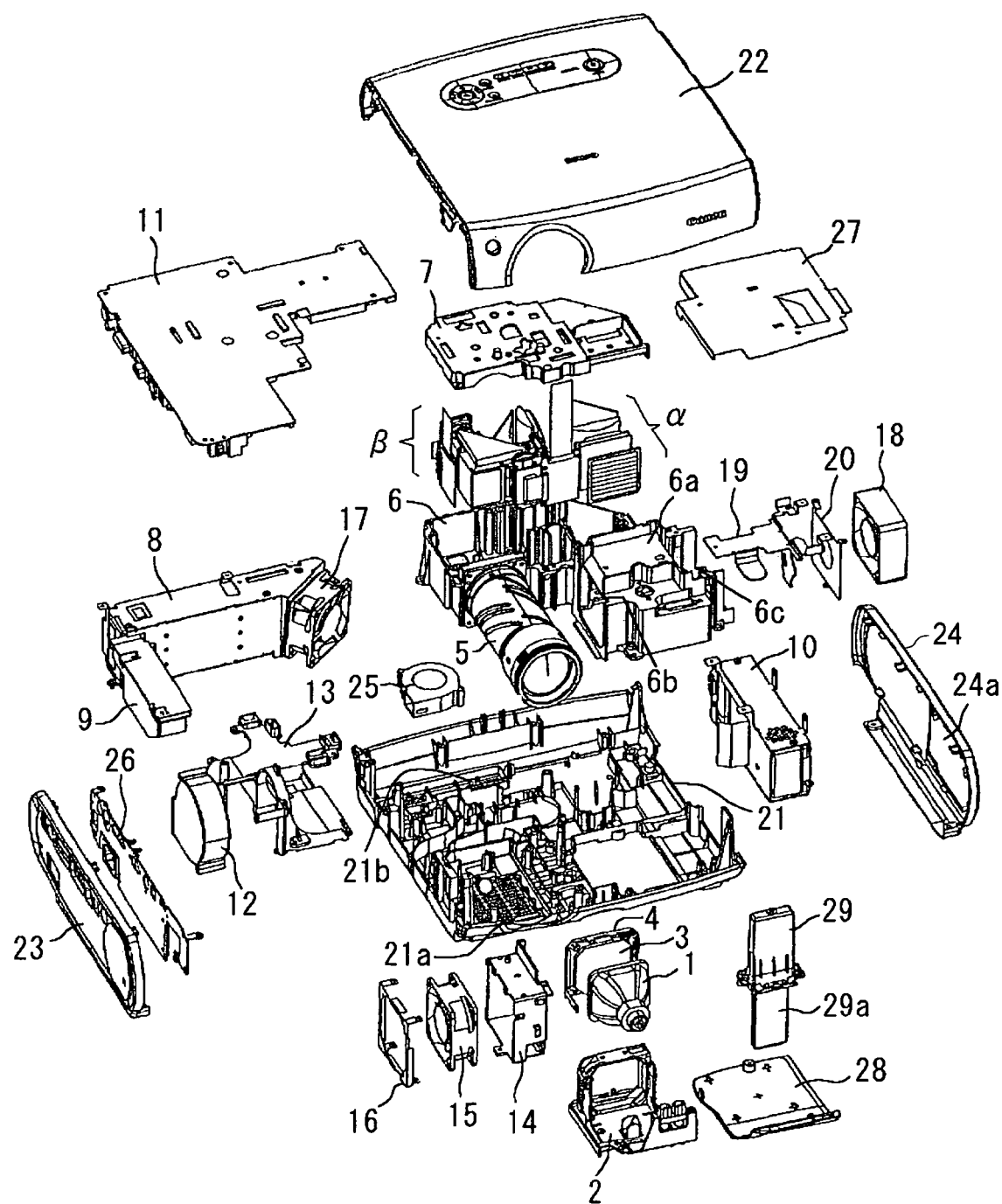
FIG. 1 illustrates a disassembled perspective view of a projection display apparatus incorporating a reflective LCD element according to a first exemplary embodiment.

The following description of exemplary embodiment(s) is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate. For example optical element formation and manufacturing may not be discussed in detail, however such processes as known by one of ordinary skill in the art and equivalent methods, processes, and materials would fall within the intended scope of exemplary embodiments.

Additionally exemplary embodiments are not limited to projector systems but can be used for any system that has noise and/or vibration due to a mechanical cooling system.

Notice that similar reference numerals and letters refer to similar items in the following figures, and thus once an item is defined in one figure, it may not be discussed for following figures.

First Exemplary Embodiment

Figure 2:
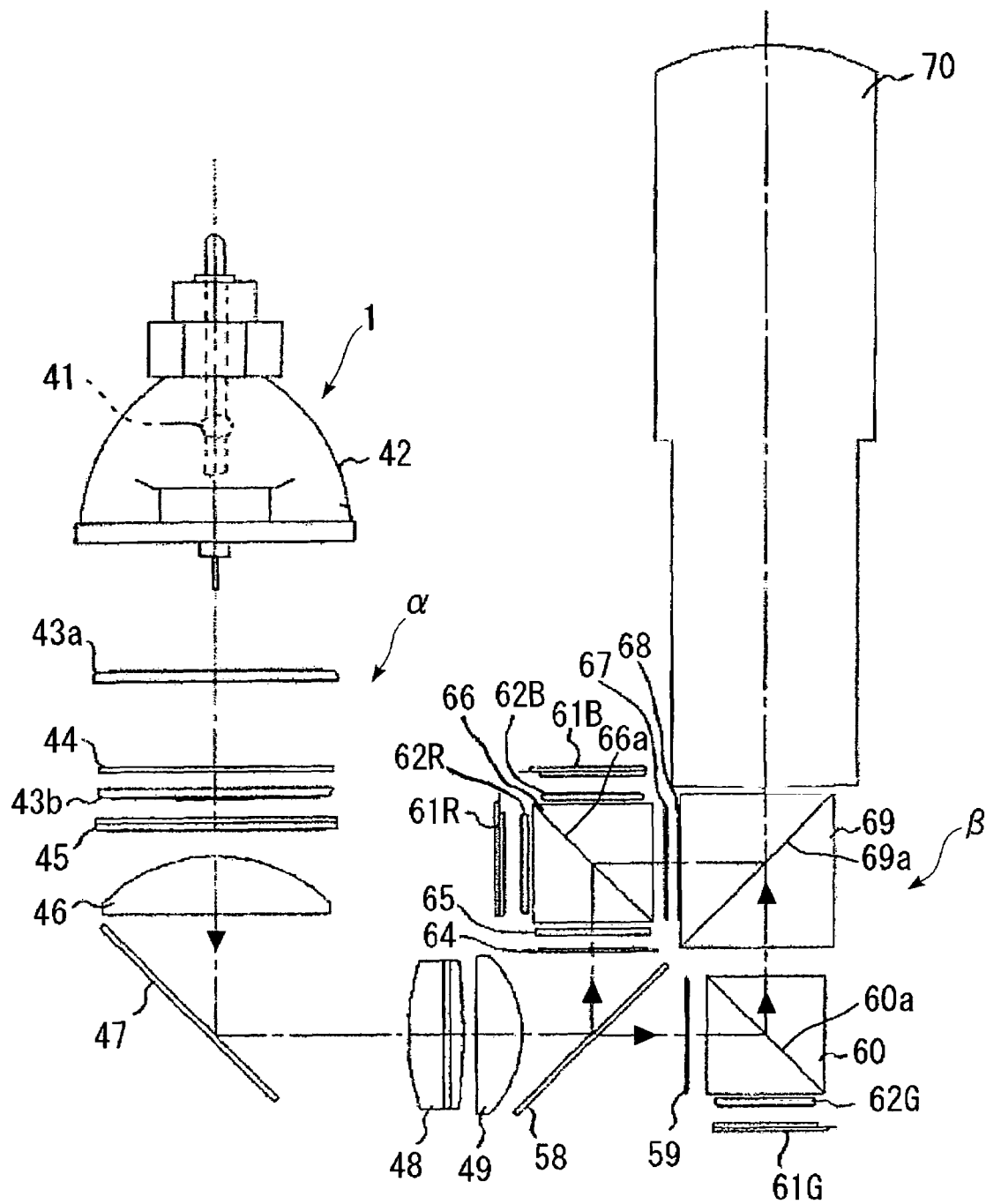
FIG. 2 illustrates the optical structure of the projection display apparatus incorporating the reflective LCD element according to the first exemplary embodiment.

FIG. 1 illustrates a schematic view of a projection display apparatus (image display apparatus) according to a first exemplary embodiment. FIG. 2 is a schematic view of the optical structure of the projection display apparatus shown in FIG. 1. In FIGS. 1 and 2, a light source lamp (lamp) 1 is held by a lamp holder 2. An explosion-proof glass 3 disposed in front of the lamp 1 is held by a glass holder 4. An illumination optical system $\alpha$ functions to make light incident from the lamp 1 enter a color separation and combination optical system $\beta$ including a liquid-crystal panel (LCD element, or image-forming element) for the three primary colors of incident light (red, green, and blue, or RGB). A projection lens barrel 5 accommodates a projection lens system (projection optical system) 70 configured to project an image onto a screen (a projection plane), which is not shown, after receiving the light from the color separation and combination optical system $\beta$.

An optical box 6 contains the lamp 1, the illumination optical system $\alpha$, and the color separation and combination optical system $\beta$. The projection lens barrel 5 is fixed or operatively connected to the optical box 6. The optical box 6 includes a lamp casing 6a functioning as a lamp peripheral member that surrounds the lamp 1.

An optical-box lid 7 covers the optical box 6 containing the illumination optical system α and the color separation and combination optical system β within. A power source 8 and a power-source filter 9 are also included in the projection display apparatus. A ballast power source 10 functions to turn on the lamp 1. A circuit board 11 functions to drive the liquid-crystal panel and send an instruction to turn on the lamp 1 which can use power from the power source 8. An LCD-element cooling fan 12 is used for cooling an optical element, including the liquid-crystal panel, within the color separation and combination optical system β by taking in air through an intake 21a of an exterior cabinet (bottom casing) 21, which is described below. A fan duct 13 is used for supplying a current of air from the LCD-element cooling fan 12 to the optical element including the liquid-crystal panel within the color separation and combination optical system β.

A lamp cooling fan (axial fan) 15 is used for cooling the lamp 1 by blowing air to the lamp 1 and is disposed in a gap between the lamp 1 and the projection lens barrel 5 with a predetermined clearance.

A fan holder 14 holds the lamp cooling fan 15. A fan retaining plate 16 retains the lamp cooling fan 15. A power-source cooling fan 17 is used for cooling both the power source 8 and the ballast power source 10 by taking in air through an intake 21b of the exterior cabinet 21, circulating the air into the power source 8, and blowing a current of air to the ballast power source 10.

An exhaust fan 18 is used for discharging heated air after it has passed through the lamp 1 from the lamp cooling fan 15 and after it has passed through the ballast power source 10 to outside the projection display apparatus via an exhaust port 24a of a side panel 24, which is described later, of the exterior.

A heat dissipating plate 19 and a light-shielding mask 20 function to dissipate heat of the lamp 1, function as a ventilating duct for letting the heated air that has passed through the lamp 1 move therein, and function to reduce the light being emitting from the lamp 1 from escaping to the outside of the projection display apparatus.

The exterior cabinet (bottom casing) 21 contains the optical box 6. An exterior-cabinet cover (top casing) 22 covers the exterior cabinet 21 containing the optical box 6 within. A side panel 23 is also included in the projection display apparatus.

The exterior cabinet 21 includes the intake 21a and the intake 21b. The side panel 24 includes the exhaust port 24a.

A polarizing-element cooling fan 25 is used for cooling an optical element, including a polarizing element, within the color separation and combination optical system 1 by blowing air taken from an intake (not shown) of the exterior cabinet 21 to the optical element including the polarizing element via a duct (not shown) of the exterior cabinet 21.

An interface reinforcing plate 26 is mounted inside the side panel 23. An exterior dissipating plate 27 is mounted on the lamp casing 6a and functions to dissipate heat from the lamp 1.

A lamp lid 28 is removably fixed or operatively connected to the bottom surface of the exterior cabinet 21 with a screw (not shown). An adjusting leg 29 is fixed or operatively connected to the exterior cabinet 21 and is capable of adjusting the height of a leg 29a. The angle of inclination of the projection display apparatus with respect to the screen is adjustable by this adjustment of the height of the leg 29a.

The optical structure including: the lamp 1, the illumination optical system α, the color separation and combination optical system β, and the projection optical system 70 (of FIG. 2) disposed in the projection lens barrel 5 in the projection display apparatus incorporating the reflective LCD element (image-forming element, e.g., a reflective liquid-crystal panel) is described below with reference to FIG. 2.

In FIG. 2, a light-emitting tube 41 functions to emit white light with a continuous spectrum. A reflector 42 is used for concentrating the light from the light-emitting tube 41 into a predetermined direction. Each of the light-emitting tube 41 and the reflector 42 serves as one component of the lamp 1.

A first cylindrical array 43a includes a lens array including a plurality of cylindrical lenses, each having a refractive power in the vertical direction (a direction substantially perpendicular to the propagation direction of the light from the lamp 1, i.e., a direction substantially perpendicular to the plane of FIG. 2). A second cylindrical array 43b includes a lens array including a plurality of cylindrical lenses individually corresponding to the plurality of cylindrical lenses of the first cylinder array 43a. An ultraviolet filter 44 is also included in the projection display apparatus. A polarization element 45 is used for converting unpolarized light to light with a predetermined polarization.

A front compressor lens 46 includes a cylindrical lens having a refractive power in the horizontal direction (in the plane of FIG. 2). A mirror 47 is used for changing the direction of the incident light by 90 degrees. A condenser lens 48 is also included in the projection display apparatus. A rear compressor lens 49 includes a cylindrical lens having a refractive power in the horizontal direction.

Each of the elements described above serves as one component of the illumination optical system a.

A dichroic mirror 58 functions to reflect light components with red and blue wavelengths while facilitating the passage of light components with a green wavelength. A first polarizer 59 deals with the green component of light incident from the dichroic mirror 58. The first polarizer 59 can be a transparent substrate to which a polarizing element is bonded, and facilitates the passage of s-polarized light of the incident light. A first polarizing beam splitter (PBS) 60 functions to reflect the s-polarized light of the incident light while letting the p-polarized light of the incident light pass through. The first PBS 60 includes a polarization separation surface 60a.

A reflective LCD element 61 reflects the incident light while performing image modulation on each component of the incident light and includes an R-component reflective LCD element 61R for the red component of light, a G-component reflective LCD element 61G for the green component of light, and a B-component reflective LCD element 61B for the blue component of light.

A quarter-wave plate 62 includes an R-component quarter-wave plate 62R for the red component of light, a G-component quarter-wave plate 62G for the green component of light, and a B-component quarter-wave plate 62B for the blue component of light. A second polarizer 64 deals with the red and blue components of light incident from the dichroic mirror 58 and is a transparent substrate to which a polarizing element is bonded. The second polarizer 64 facilitates the passage of s-polarized light of the incident light. A first color-selective retardation film 65 is used for changing the polarization direction of the blue component of light by 90 degrees while leaving the polarization direction of the red component of light unchanged. A second PBS 66 functions to reflect the s-polarized light of the incident light while letting the p-polarized light of the incident light pass through. The second PBS 66 includes a polarization separation surface 66a.

A second color-selective retardation film 67 is used for changing the polarization direction of the red component of light by 90 degrees while leaving the polarization direction of the blue component of light unchanged. A third polarizer 68 (polarizing element) deals with the red and blue components of light projection display apparatus and facilitates the passage of s-polarized light of the incident light. A third PBS 69 (color combination unit) functions to reflect the s-polarized light of the incident light while letting the p-polarized light of the incident light pass through. The third PBS 69 includes a polarization separation surface 69a.

Each of the members from the dichroic mirror 58 to the third PBS 69 described above serves as one component of the color separation and combination optical system β.

The illumination optical system α, the color separation and combination optical system β, and the projection optical system 70 constitute an image displaying optical system.

The optical behavior is described next. A light beam emitted from the light-emitting tube 41 is concentrated into a predetermined direction by the reflector 42. The reflector 42 has a paraboloidal reflective surface, so that a light beam from the focal point of the paraboloidal surface is made parallel with the symmetry axis (optical axis) of the paraboloidal surface. However, the light-emitting tube 41 is not an ideal point source and includes a finite-size light-emitting portion. Therefore, the concentrated light beam actually contains many components that are not parallel with the symmetry axis of the paraboloidal surface.

Then, the light beam enters the first cylindrical array 43a. The incident light beam is separated into a plurality of light beams corresponding to the individual cylinder lenses and concentrated (as a series of bands extending along the horizontal direction). The light beams then pass through the second cylindrical array 43b via the ultraviolet filter 44, and a plurality of light beams (a series of bands extending along the horizontal direction) is formed in the vicinity of the polarization element 45.

The polarization element 45 includes a plurality of polarization separation surfaces arranged in the vertical direction, a reflective surface, and a half-wave plate. The plurality of light beams enters the corresponding polarization separation surfaces and then is separated into a p-polarized transmitted component and an s-polarized reflected component.

The s-polarized reflected component is reflected from the reflective surface and exits in the same direction as that of the p-polarized light. The p-polarized transmitted component passes through the half-wave plate, is transformed to the same polarized component as the s-polarized light, and exits from the polarization element 45 as light in which the polarization direction is uniformly oriented. After exiting from the polarization element 45, the plurality of light beams (a series of bands extending in the horizontal direction) subjected to polarization transformation is reflected from the mirror 47 by 90 degrees via the front compressor lens 46 and then reaches the condenser lens 48 and the rear compressor lens 49.

The optical properties of the front compressor lens 46, the condenser lens 48, and the rear compressor lens 49 are appropriately set. The plurality of light beams forms rectangular images overlapping one another, so that a rectangular uniform illumination area is formed.

In this illumination area, the LCD element 61 (the R-component reflective LCD element 61R, the G-component reflective LCD element 61G, and the B-component reflective LCD element 61B, which are described below) is disposed. The s-polarized light made by the polarization element 45 enters the dichroic mirror 58. The dichroic mirror 58 reflects the blue component of light (wavelengths of 430 nm to 495 nm) and the red component of light (wavelengths of 590 nm to 650 nm) while letting the green component of light (wavelengths of 505 nm to 580 nm) pass through.

The optical path of the green component of light is described next. The green component of light passing through the dichroic mirror 58 enters the first polarizer 59. The green component remains being the s-polarized light after it has been separated by the dichroic mirror 58. After exiting from the first polarizer 59, the green component of light enters the first PBS 60 as the s-polarized light, is reflected from the polarization separation surfaces, and reaches the G-component reflective LCD element 61G. In the G-component reflective LCD element 61G, the green component of light is subjected to image modulation and then reflected. The s-polarized light of the green-component reflected light subjected to image modulation is reflected from the polarization separation surface 60a of the first PBS 60 again and returned to a side of the lamp 1, thus at least a portion is removed from projection light.

On the other hand, the p-polarized light of the green-component reflected light subjected to image modulation passes through the polarization separation surface 60a of the first PBS 60 and is directed as the projection light to the third PBS 69.

At this time, in a state in which all polarized components are transformed to the s-polarized light (black is displayed), adjusting the slow axis of the G-component quarter-wave plate 62G disposed between the first PBS 60 and the G-component reflective LCD element 61G to a predetermined direction can reduce the adverse effects of irregular variations in a polarized state occurring in the first PBS 60 and the G-component reflective LCD element 61G.

The green component of light exiting from the first PBS 60 enters the third PBS 69 as the p-polarized light, passes through the polarization separation surface 69a of the third PBS 69, and reaches the projection optical system 70.

On the other hand, the red and blue components of light reflected from the dichroic mirror 58 enter the second polarizer 64. These red and blue components of light remain being the s-polarized lights after they have been separated by the dichroic mirror 58. After exiting from the second polarizer 64, the red and blue components of light enter the first color-selective retardation film 65. The first color-selective retardation film 65 functions to rotate the polarization direction by 90 degree with respect to the blue component of light. Therefore, the blue component of light enters the second PBS 66 as the p-polarized light, whereas the red component of light enters the second PBS 66 as the s-polarized light. After entering the second PBS 66, as the s-polarized light, the red component of light is reflected from the polarization separation surface 66a of the second PBS 66 and reaches the R-component reflective LCD element 61R. After entering the second PBS 66, as the p-polarized light, the blue-component of light passes through the polarization separation surface 66a of the second PBS 66 and reaches the B-component reflective LCD element 61B.

The red component of light entering the R-component reflective LCD element 61R is then subjected to image modulation and reflected. The s-polarized light of the red-component reflected light subjected to image modulation is reflected from the polarization separation surface 66a of the second PBS 66 again and returned to the side of the lamp 1, thus at least a portion is removed from the projection light. The p-polarized light of the red-component reflected light subjected to image modulation passes through the polarization separation surface 66a of the second PBS 66 and is directed as the projection light to the second color-selective retardation film 67.

The blue component of light entering the B-component reflective LCD element 61B is then subjected to image modulation and reflected. The p-polarized light of the blue-component reflected light subjected to image modulation passes through the polarization separation surface 66a of the second PBS 66 and is returned to the side of the lamp 1, thus at least a portion is removed from the projection light.

The s-polarized light of the blue-component reflected light subjected to image modulation is reflected from the polarization separation surface 66a of the second PBS 66 and directed as the projection light to the second color-selective retardation film 67.

At this time, adjusting the slow axis of each of the R-component quarter-wave plate 62R disposed between the second PBS 66 and the R-component reflective LCD element 61R and the B-component quarter-wave plate 62B disposed between the second PBS 66 and the B-component reflective LCD element 61B can adjust a state in which black is displayed with respect to each of the red and blue components of light, as is the case with the green component of light.

In this way, the light beams are combined into one light beam. The polarization direction of the red component in the projection light including the red and blue components exiting from the second PBS 66 is rotated by the second color-selective retardation film 67 by 90 degrees, so that it is changed to the s-polarized light of light. The red component is then polarized by the third polarizer 68 and enters the third PBS 69.

The blue component of light passes through the second color-selective retardation film 67 as the s-polarization, is polarized by the third polarizer 68, and enters the third PBS 69. In this case, the red and blue components of light are polarized by the third polarizer 68, so that unnecessary components produced by the second PBS 66, the R-component reflective LCD element 61R, the B-component reflective LCD element 61B, the R-component quarter-wave plate 62R, and the B-component quarter-wave plate 62B are reduced from the resulting projection light of the red and blue components.

The projection light of the red and blue components entering the third PBS 69 is reflected from the polarization separation surface 69a of the third PBS 69, combined with the green component of light passing through the polarization separation surface 69a of the third PBS 69 to form combined projection light, and reaches the projection optical system 70.

An image formed from the combined projection light of the red, green, and blue components is enlarged using the projection optical system 70 and projected onto a projection plane (e.g., a screen).

The optical path described above is of the reflective LCD element in a mode in which white is displayed. The optical path of the reflective LCD element in a mode in which black is displayed is described below.

The optical path of the green component of light is described. The s-polarized light of the green-component light passing through the dichroic mirror 58 enters the first polarizer 59 and then enters the first PBS 60. The s-polarized light is reflected from the polarization separation surface 60a of the first PBS 60 and reaches the G-component reflective LCD element 61G. Since the G-component reflective LCD element 61G is in the mode in which black is displayed, the green component is reflected without being subjected to image modulation.

As a result, since the green component is the s-polarized light after it has been reflected from the G-component reflective LCD element 61G, the green component is reflected from the polarization separation surface 60a of the first PBS 60, passes through the first polarizer 59, and is returned to the side of the lamp 1, thus at least a portion is removed from the projection light.

The optical paths of the red and blue components are described next. The s-polarized lights of the red and blue components of light reflected from the dichroic mirror 58 enter the second polarizer 64. The red and blue components then exit from the second polarizer 64 and enter the first color-selective retardation film 65. The first color-selective retardation film 65 functions to rotate the polarization direction by 90 degree with respect to the blue component of light. Therefore, the blue component of light enters the second PBS 66 as the p-polarized light, whereas the red component of light enters the second PBS 66 as the s-polarized light.

After entering the second PBS 66, as the s-polarized light, the red component of light is then reflected from the polarization separation surface 66a of the second PBS 66 and reaches the R-component reflective LCD element 61R. After entering the second PBS 66, as the p-polarized light, the blue component of light passes through the polarization separation surface 66a of the second PBS 66 and reaches the B-component reflective LCD element 61B.

Since the R-component reflective LCD element 61R is in the mode in which black is displayed, the red component entering the R-component reflective LCD element 61R is reflected without being subjected to image modulation. As a result, since the red component remains being the s-polarized light after it has been reflected from the R-component reflective LCD element 61R, the red component is reflected from the polarization separation surface 66a of the second PBS 66, passes through the second polarizer 64, and is returned to the side of the lamp 1, thus at least a portion is removed from the projection light. Therefore, black is displayed.

Since the B-component reflective LCD element 61B is in the mode in which black is displayed, the blue component is reflected without being subjected to image modulation. As a result, since the blue component remains being the p-polarized light after it has been reflected from the B-component reflective LCD element 61B, the blue component passes through the polarization separation surface 66a of the second PBS 66 and is then transformed to the s-polarized light by the first color-selective retardation film 65. The s-polarized light then passes through the second polarizer 64 and is returned to the side of the lamp 1, thus at least a portion is removed from the projection light.

The optical structure of the projection display apparatus incorporating the reflective LCD element (reflective liquid-crystal panel) is described above.

Figure 3A:
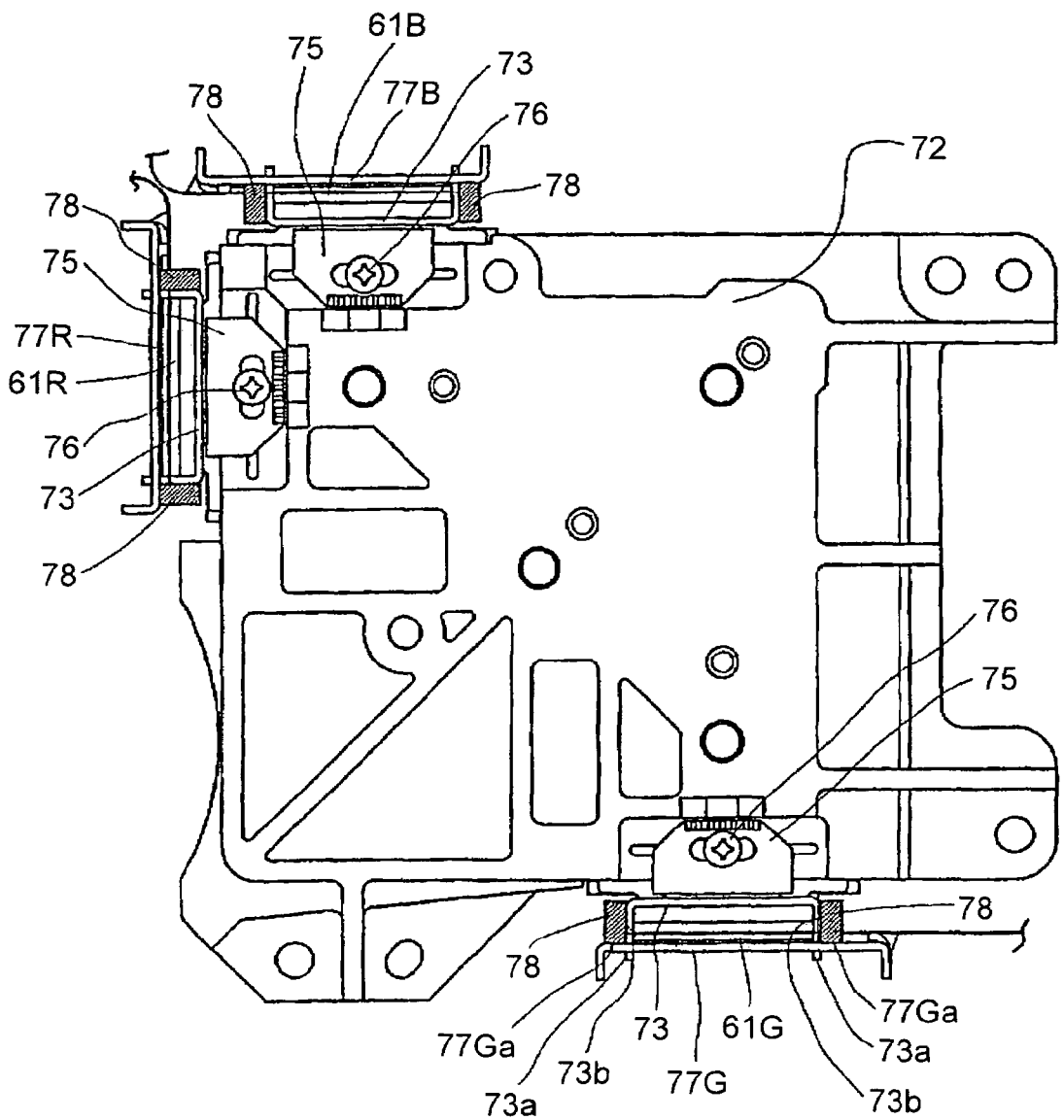
FIGS. 3A to 3C show are schematic views of the projection display apparatus according to the first exemplary embodiment.
Figure 3B:
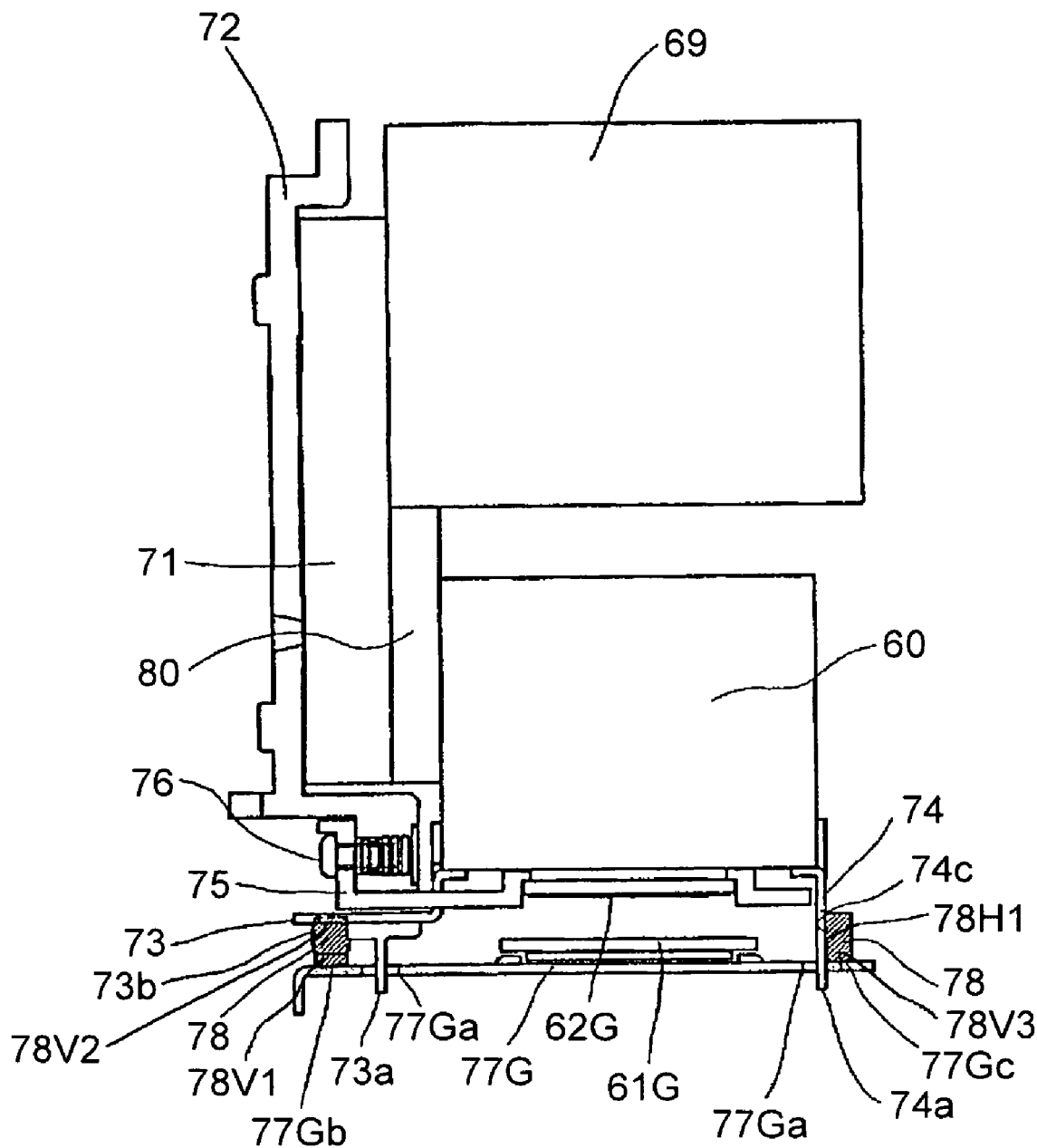
Figure 3C:
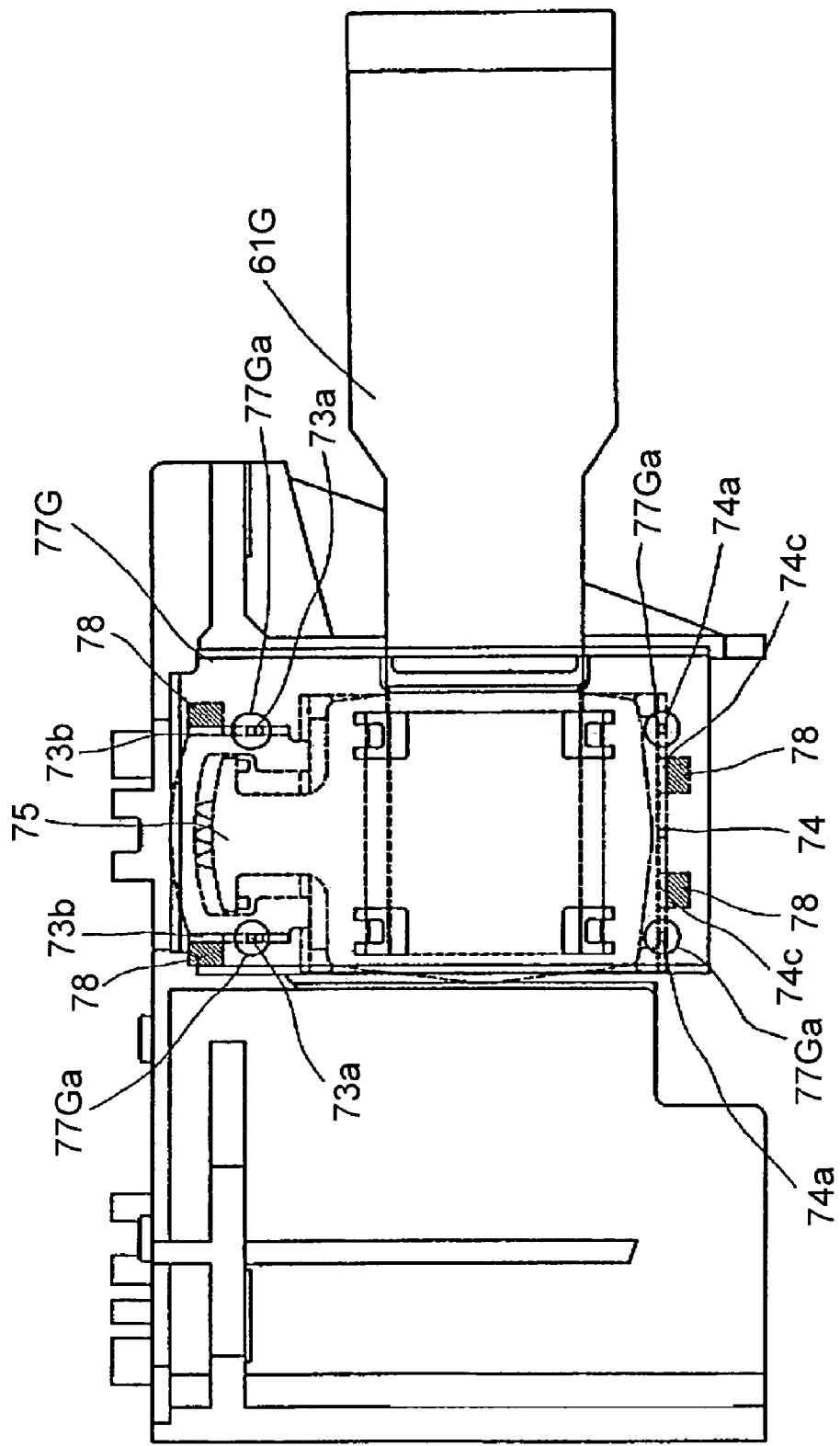

Next, the holding structure of the color separation and combination optical system β and its surroundings is described with reference to FIGS. 3A to 3C. A small glass block 80 is bonded to the top face of the first PBS 60. A large glass block 71 holds the third PBS 69 by being bonded to the top of the third PBS 69, and holds the first PBS 60 by being bonded to the small glass block 80.

A prism base 72 holds the first PBS 60, the second PBS 66, and the third PBS 69 via the large glass block 71 and directly holds the dichroic mirror 58, the first polarizer 59, the second polarizer 64, and the second color-selective retardation film 67. Top panel holders 73 (a first securing member) and bottom panel holders 74 (the first securing member) are disposed such that one of the top panel holders 73 and one of the bottom panel holders 74 are bonded and fixed or operatively connected to the top and bottom sides of the first PBS 60, respectively, and that two of the top panel holders 73 and two of the bottom panel holders 74 are bonded and fixed or operatively connected to the second PBS 66 in the color separation and combination optical system β.

A quarter-wave plate holder 75 holds the quarter-wave plate 62 and is fixed or operatively connected to the prism base 72 with a screw 76. Panel fixing frames (second securing members) 77R, 77G, and 77B for the R-component reflective LCD element 61R, the G-component reflective LCD element 61G, and the B-component reflective LCD element 61 B, respectively, directly holds the LCD element 61. Acrylic spacers 78 serve as final fixing units.

In this exemplary embodiment, final fixation is realized using: the top panel holders 73 (first securing member) and bottom panel holders 74 (first securing member) fixed or operatively connected to the first PBS 60 (prism) and the second PBS 66 (prism) and including bonding surfaces 78H1 parallel to an optical axis of a light beam entering the R-component reflective LCD element 61R, the G-component reflective LCD element 61G, and the B-component reflective LCD element 61B (image-forming element); the G-component panel fixing frame 77G (second securing member) holding the image-forming element and including boding faces 78V1 and 78V2 substantially perpendicular to the optical axis of the light beam entering the image-forming element; and the spacers 78 bonded to the top panel holders 73, the bottom panel holders 74, and the G-component panel fixing frame 77G.

The temporary fixation and final fixation are described below using the G-component reflective LCD element 61G as an example. The G-component reflective LCD element 61G is reliably held by the G-component panel fixing frame 77G (second securing member) in advance. The G-component reflective LCD element 61G and the G-component panel fixing frame 77G constitute a G-component panel unit.

Bonding by ultraviolet curing, taking into in consideration of the curing time of adhesive, the simplicity of equipment, and the flexibility in the six axes, can be used to fix the G-component panel unit (61G and 77G) to the first PBS 60 at a predetermined position after performing a six-axis adjustment.

The temporary fixation of the G-component panel unit (61G and 77G) to the first PBS 60 is realized by bonding a first pin portion 73a of the top panel holders 73 and a first opening 77Ga of the G-component panel fixing frame 77G with large amounts of UV adhesive and by bonding a first pin portion 74a of the bottom panel holders 74 and a second opening 77Ga of the G-component panel fixing frame 77G with large amounts of UV adhesive.

As described above, in this exemplary embodiment, the first securing member (73 and 74) and the second securing member (77G) have the temporary fixing unit (73a, 74a, and 77Ga) for temporarily fixing, or operatively connecting, with each other.

In this state, since plenty of UV adhesive is present between the pin portions 73a and 74a and the openings 77Ga, a stress occurring when the adhesive is cured and contracted remains. In addition, since the adhesive including relatively soft blocks is present, the accuracy of holding the position of the G-component panel unit (61G and 77G) becomes unstable with variations in temperature.

In order to address this, the spacers 78 are placed adjacent to the pin portions 73a and 74a and they are bonded and fixed closely, thus realizing the final fixation. This final fixation ensures reliability and strength. A first spacer 78 is bonded and fixed by pressing a face 78V1 (substantially perpendicular to an optical axis of a light beam entering the LCD element) of the first spacer 78 against an upper portion 77Gb of the G-component panel fixing frame 77G and pressing a face 78V2 (substantially perpendicular to the optical axis of the light beam entering the LCD element) of the first spacer 78 against a lower portion 73b of a first top panel holder 73. Similarly, a second spacer 78 is bonded and fixed by pressing a face 78V3 (substantially perpendicular to the optical axis of the light beam entering the LCD element) of the second spacer 78 against a face 77Gc of the G-component panel fixing frame 77G and pressing a face 78H1 (parallel to the optical axis of the light beam entering the LCD element) of the second spacer 78 against a face 74c (parallel to the optical axis of the light beam entering the LCD element) of a first bottom panel holders 74.

Therefore, the final fixation which is stronger and more reliable than the temporary fixation is realized with the rigid spacers 78 and the individual rigid thin bonding layers.

In this exemplary embodiment, the spacers 78 are disposed on the G-component panel fixing frame 77G and arranged around the periphery of the G-component reflective LCD element 61G at three or four points.

The spacers 78 and the temporary fixing units (73a, 74a, and 77Ga) are disposed on the G-component panel fixing frame 77G and arranged outside the top and bottom sides defining the outer shape of the G-component reflective LCD element 61G.

At least one of the plurality of spacers 78 is adjacent to one of the pin portions 74a and one of the openings 77Ga.

To increase the bonding strength and the reliability of accuracy, thinner bonding layers can be used because of characteristics (e.g., hygroscopic properties). Placing the final fixing units adjacent to the temporary fixing units can reduce an arm length of a moment component produced by a force other than that in a direction of a line between the temporary fixing units and the final fixing units, thus realizing the strong final fixation.

If the final fixing units are limited to the positions of one-half of the temporary fixing units in order to reduce the number of final fixing units to be placed, at least one exemplary embodiment arranges the final fixing units at the midpoint of each of the temporary fixing units. In this case, however, the panel fixing frame 77G can be deformed by expansion of the spacers 78. To reduce this problem, the final fixing units are placed adjacent the relatively-rigid temporary fixing units along the optical axis, thus reducing the deformation of the panel fixing frame 77G.

In addition, each of the spacers 78 has a rectangular parallelepiped shape, and therefore, the spacer 78 can be smoothly pressed against two faces that are substantially perpendicular to each other. As a result, the thickness of the bonding layer at this bonding surface can be greatly reduced. The rectangular-parallelepiped spacer 78 can be easily formed by die forming or machining. In some cases, the spacer 78 can be replaced with an element formed from a material with a low coefficient of linear expansion (e.g., a glass material).

Since the spacers 78 can be readily inserted from upper and lower areas that are opened after the completion of the temporary fixation, the optical system has an increased degree of flexibility, and special equipment is not required.

The R-component reflective LCD element 61R and the B-component reflective LCD element 61B are fixed or operatively connected to the second PBS 66 by the temporary fixation and the final fixation with the spacers 78, as is the case with the G-component reflective LCD element 61G. The LCD element 61 can be replaced with a transmissive LCD element.

According to this exemplary embodiment, the top panel holders 73 and the bottom panel holders 74 holding the first PBS 60 and the second PBS 66 for combining the light beams from the LCD element 61 is fixed or operatively connected to the panel fixing frame 77G to which the LCD element 61 is fixed through the temporary fixation and the final fixation, so that the number of intermediates required can be reduced. Therefore, the resistance to shock and vibration caused by dropping is improved.

The number of final fixing units is the same as the number of temporary fixing units, and the final fixing units are disposed adjacent to the temporary fixing units. Therefore, when a stress existing in the temporary fixing units is released with change over time, amplification of a force caused by a moment can be reduced and the force can be distributed, thus resulting in an increased reliability.

When the spacers 78 undergo thermal expansion, the temporary fixing units produce a counter force suppressing the deformation of the panel fixing frame 77G to which the LCD element 61 is fixed or operatively connected. This reduces low contrast situations and local defects of adjustment of light amounts in LCD elements caused by the deformation of the LCD element 61 resulting from the deformation of the panel fixing frame 77G.

The bonding surfaces of the spacers 78 used in the final fixing units use the face 78H, which is parallel to the optical axis, and the face 78V, which is substantially perpendicular to the optical axis. As a result, the accuracy of fixing is maintained at an increased level while the flexibility in the LCD element along a direction parallel to the optical axis and along a direction perpendicular to the optical axis is fully secured.

The stress in other directions is relatively small, and therefore, the need for producing the counter force is relatively low. Since the bonding surfaces of the spacers 78 can be formed such that the use of adhesive blocks is reduced, a contraction occurring when adhesive is cured in the final fixation units is very small. As a result, the final fixation can be performed while the temporary fixation is maintained at an increased level.

Since the final fixation is completed using a very small amount of adhesive, the adverse effect of the release of stress and the deterioration caused by change over time is very small. This reduces possible adverse reactions occurring when the adhesive is cured.

The spacers 78 are made from a light-transmitting material (e.g., a glass material, an acrylic material, a polycarbonate material, other light transmitting material as known by one of ordinary skill and equivalents). Therefore, the spacers 78 can be bonded by being cured with a UV adhesive. This improves the workability and thus shortens the production time. In addition, the final fixation is completed before an early-change over time occurs, so that the accuracy of adjusting and holding the LCD element is maintained at an increased level.

The bonding surface of the spacer 78 uses the face 78H, which is parallel to the optical axis, and the face 78V, which is substantially perpendicular to the optical axis.

The face 78H can be formed with increased accuracy by using a face from which a member attached to the PBS (prism) is bend by 90 degrees or a face extending from a member attached to the top face of the PBS (prism). The face 78V, which is substantially perpendicular to the optical axis, is equal to a display surface of the LCD element 61. Therefore, the face 78V is formed in a member for holding the LCD element 61 without having to performing bending thereon. Thus, the face 78V can be relatively easily assigned.

The bonding surfaces of the spacers 78 used in the final fixation use the face parallel to the optical axis and the face substantially perpendicular to the optical axis, so that mounting and irradiating operations can be easily performed using an area opened about 90 degrees.

As described above, according to at least one exemplary embodiment, the image-forming element can be accurately fixed or operatively connected to the target fixation member, and therefore, the projection display apparatus configured to project image information realized by the image-forming element with increased resolution is obtained.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions. For example, in the interest of acting as ones own lexicographer, although the following claims cite terms such as "perpendicular", the intended meaning of these terms within the scope of the claims is to include arrangements where the "substantially perpendicular" or "essentially perpendicular."

This application claims the benefit of Japanese Application No. 2004-271576 filed Sep. 17, 2004, which is hereby incorporated by reference herein in its entirety.

What is claimed is:

1. A projection display apparatus configured to project an image on a projection plane, the image being formed using light from a light source by an image-forming element, the projection display apparatus comprising:
    a prism;
    a first securing member operatively connected to the prism and including a bonding surface parallel to an optical axis of a light beam entering the image-forming element;
    a second securing member holding the image-forming element and including a bonding surface perpendicular to the optical axis of the light beam entering the image-forming element; and
    at least one spacer bonded between the bonding surfaces of the first securing member and the second securing member.

2. The projection display apparatus according to claim 1, further comprising:
    at least one temporary fixing unit temporarily operatively connecting the first securing member and the second securing member.

3. The projection display apparatus according to claim 1, wherein the at least one spacer comprises:
    a plurality of spacers disposed on the second securing member, the spacers being arranged around the periphery of the image-forming element.

4. The projection display apparatus according to claim 3, further comprising:
    a plurality of temporary fixing units temporarily operatively connecting the first securing member and the second securing member, wherein the number of spacers is the same as the number of temporary fixing units.

5. The projection display apparatus according to claim 1, wherein the at least one spacer comprises a plurality of spacers disposed on the second securing member, the spacers being arranged outside the top and bottom sides of the image-forming element.

6. The projection display apparatus according to claim 1, wherein the at least one spacer is made from a light-transmitting material.

7. The projection display apparatus according to claim 1, wherein the prism is included in a color separation and combination optical system.

8. The projection display apparatus according to claim 1, wherein the image-forming element is a reflective liquid-crystal display element.

* * * * *